US012392184B2

(12) United States Patent
Janick et al.

(10) Patent No.: US 12,392,184 B2
(45) Date of Patent: Aug. 19, 2025

(54) SECTIONAL DOOR BRAKING SYSTEM

(71) Applicant: CornellCookson, LLC, Mountain Top, PA (US)

(72) Inventors: James Janick, Shavertown, PA (US); George Gendler, Mountaintop, PA (US)

(73) Assignee: CornellCookson, LLC, Mountain Top, PA (US)

( * ) Notice: Subject to any disclaimer, the term of this patent is extended or adjusted under 35 U.S.C. 154(b) by 422 days.

(21) Appl. No.: 17/963,391

(22) Filed: Oct. 11, 2022

(65) Prior Publication Data

US 2024/0117661 A1 Apr. 11, 2024

(51) Int. Cl.
*E05D 13/00* (2006.01)

(52) U.S. Cl.
CPC ................................ *E05D 13/1238* (2013.01)

(58) Field of Classification Search
CPC ................ E05D 13/003; E05D 13/006; E05Y 2900/106; E06B 9/0676
See application file for complete search history.

(56) References Cited

U.S. PATENT DOCUMENTS

| | | | | |
|---|---|---|---|---|
| 1,404,053 | A * | 1/1922 | Peelle | E05D 13/006 16/DIG. 20 |
| 2,869,183 | A * | 1/1959 | Smith | E05D 13/006 188/67 |
| 4,225,012 | A * | 9/1980 | Hindle | E05D 13/006 182/112 |
| 6,189,266 | B1 | 2/2001 | Mihalcheon | |
| 6,485,068 | B1 * | 11/2002 | Sauve | E05F 15/665 292/171 |
| 6,715,236 | B2 * | 4/2004 | Mullet | E05D 13/006 49/197 |
| 7,600,344 | B2 | 10/2009 | Michaud | |
| 8,869,450 | B2 * | 10/2014 | Balay | E05F 15/00 160/33 |
| 9,243,435 | B1 * | 1/2016 | Kaounas | E05D 13/006 |
| 9,487,987 | B2 * | 11/2016 | Baczweski | E05D 15/445 |
| 2012/0186158 | A1 * | 7/2012 | Sanke | E05D 13/006 49/322 |

(Continued)

FOREIGN PATENT DOCUMENTS

| | | | | |
|---|---|---|---|---|
| DE | 2744915 | A1 * | 4/1979 | |
| EP | 0149692 | A1 * | 4/2004 | |

(Continued)

OTHER PUBLICATIONS

EP-0149692 machine translation (Year: 1985).*

(Continued)

*Primary Examiner* — Abe Massad

(57) ABSTRACT

In example implementations, a braking system for a vertical stacking panel door is provided. The braking system includes a first rod, a strap coupled to the first rod, a second rod movably coupled to the first rod, wherein the second rod is to engage a linear ratchet when moved from a disengaged position to an engaged position, and a torsion spring coupled to the first rod and the second rod, wherein tension from the strap moves the second rod into the disengaged portion and the torsion spring moves the second rod into the engaged position when tension is lost on the strap.

20 Claims, 10 Drawing Sheets

(56) References Cited

U.S. PATENT DOCUMENTS

| | | | | |
|---|---|---|---|---|
| 2019/0316399 | A1* | 10/2019 | Sauve | E05F 15/681 |
| 2022/0170303 | A1 | 6/2022 | Janick et al. | |
| 2024/0117660 | A1* | 4/2024 | Weaver | E05D 13/1223 |

FOREIGN PATENT DOCUMENTS

| | | | | | |
|---|---|---|---|---|---|
| EP | 1413701 | A2 | * | 4/2004 | E05D 13/006 |
| EP | 3608493 | A1 | * | 2/2020 | E05D 13/006 |
| EP | 3748112 | A1 | * | 12/2020 | E05D 13/006 |
| FR | 989554 | A | * | 9/1951 | |
| FR | 1236036 | A | * | 7/1960 | |
| FR | 1446211 | A | * | 7/1966 | |
| FR | 2539178 | A1 | * | 7/1984 | |
| WO | WO-2020260125 | A1 | * | 12/2020 | E05D 13/006 |

OTHER PUBLICATIONS

International Search Report and Written Opinion mailed in corresponding PCT Application No. PCT/US2022/043233 on Feb. 23, 2023, 11 pages.

* cited by examiner

SECTIONAL DOOR BRAKING SYSTEM

BACKGROUND

Vertically moving doors can be used for a variety of applications. For example, vertically moving doors can be used as garage doors in residential locations or doors for bays and entrances to warehouses in commercial locations.

Some vertically moving doors can be pulled open through a counterbalance system that includes a motor, a torsion spring, a rotating shaft connected to the motor and torsion spring, and a cable/strap system that connects the bottom section of a door to the rotating shaft. Through the movement of the counterbalance system, the door moves along a track. Typically the moving doors can be moved along a track as a single piece to lie horizontally with the floor along the track as the sections of the door are connected by hinges. If a door has door sections that are connected by hinges to assist in moving the door along the track, then the design of the counterbalance system and the track alone provide the mechanism to open and close the door section.

DETAILED DESCRIPTION

Examples described herein provide examples of a braking system for a vertically stacking panel door that is without hinged connections between each panel. As discussed above, currently available vertically moving doors are moved along a track by a counterbalance system. The door lies horizontally or parallel with the floor.

However, there are some instances where customers would like to have less intrusion in the area above the floor where traditional sectional door would rest when opened. For example, the traditional sectional door may limit the amount of vertical clearance in the garage, commercial loading dock, and the like. In addition, with single piece doors, the entire door is replaced when damaged.

Since the panels are disconnected, there are portions during movement of the panels along a track where the panels can move freely. For example, when the door is being closed, the panels may transition from a horizontal track portion to a vertical track portion where gravity allows the panels to move freely and stack on top of one another to close.

There are certain instances where the door can close improperly, creating gaps between panels, or panels can get stuck. As a result, the panels may not move as intended, or undesirable gaps may form between panels as the door is trying to open or shut. In another example, the panels may be disrupted if machinery accidentally hits the door as the door is opening or closing.

The present disclosure provides a braking system for the vertically stacking panel door when a disruption occurs during movement of the panels. The braking system may allow the panels to hold a position when the brake is engaged. This may allow a technician to fix a disrupted panel, adjust the spacing between the panels, fix the vertically stacking panel door, and the like. Thus, potential dangerous situations may be avoided when a disruption occurs via the braking system. The braking system can be automatically engaged to stop movement of the vertically stacking panel door and prevent damage to the door or potential injuries.

Figure 1:
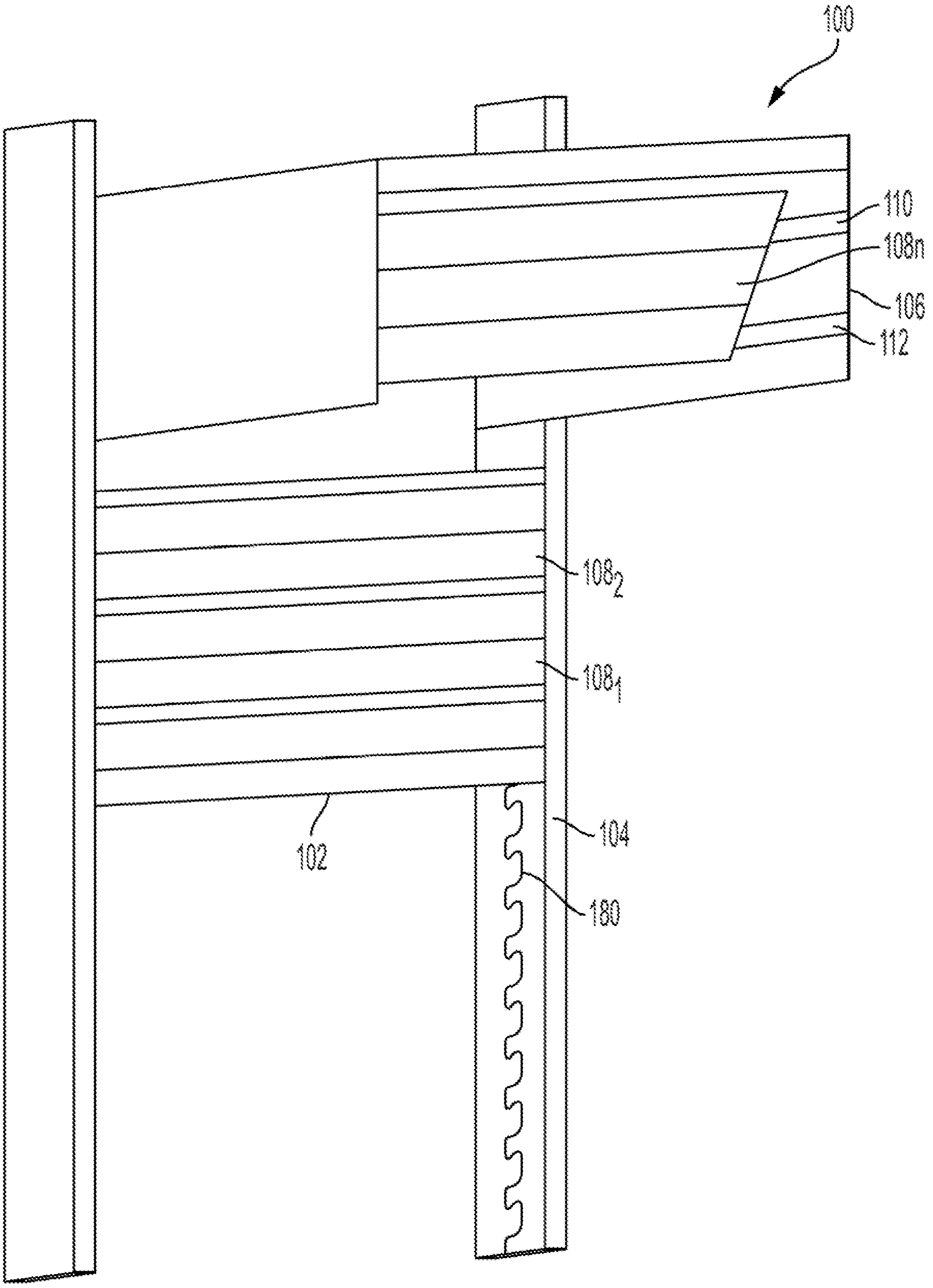
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of panels $108_1$ to $108_n$ (hereinafter also referred to individually as a panel 108 or collectively as panels 108). The door 102 may be opened by moving the panels 108 vertically along a track or track system. The track system may include different track portions that define a path along which the panels 108 may move to open and close the door 102.

In one embodiment, the track may include a vertical door guide or track 104, a panel interface zone comprising curved track portions, a first horizontal track portion 110 (also referred to herein as a first track 110) and a second horizontal track portion 112 (also referred to herein as a second track 112). The panel interface zone defines a transitional area between the vertical door guide 104 and a horizontal door guide or track 106. The panel interface zone provides the means for lifting and separating the plurality of panels 108 when the door 102 is opening and to align and place the plurality of panels 108 in tangential connection when the door 102 is closing. As the panels 108 are separated, the panels 108 can be stacked along the horizontal door guide 106. As the panels 108 are aligned and tangentially connected, the panels 108 can be stacked in a vertical orientation along the vertical door guide 104.

In one embodiment, the panels 108 may include end caps (illustrated and discussed in further details below) that include wheels that can move within a first track 110 and a second track 112. The first track 110 and the second track 112 may also be referred to as a top track 110 and a bottom track 112. The first track 110 and the second track 112 may be parallel and may be positioned at a slight angle to allow for gravity assist when the door 102 is closing.

In one embodiment, the door 102 may be closed by moving the panels 108 towards the vertical door guide 104 one-by-one. The panels 108 may be stacked on top of one another as the door 102 is closed.

In one embodiment, the vertical stacking panel door system 100 may include a linear ratchet 180 that is part of a braking system described herein. The linear ratchet 180 may be located inside of the vertical door guide 104 on each side of the door 102. In one embodiment, a single linear ratchet 180 may be deployed adjacent to the vertical door guide 104.

In one embodiment, two linear ratchets 180 may be deployed on opposite sides of the door 102. That is, a first linear ratchet 180 may be located on a first side of the door 102 and a second linear ratchet 180 may be located on a second side of the door 102 that is opposite the first side.

Figure 2:
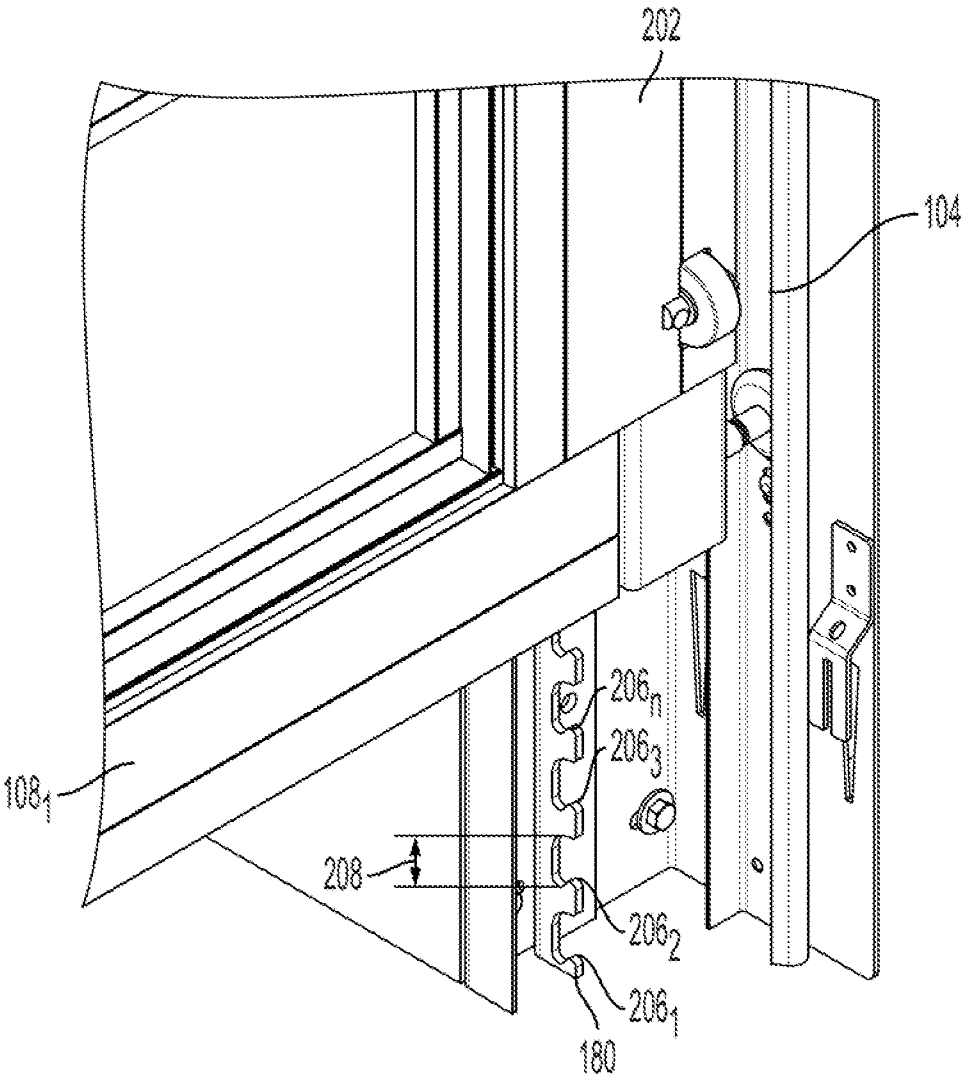
FIG. 2 is a zoomed in view of an example linear ratchet of the braking system of the present disclosure.

FIG. 2 illustrates a zoomed in view of a section of the linear ratchet 180 coupled adjacent to the vertical guide 104. The linear ratchet 180 may be fabricated from steel or sheet metal.

The linear ratchet 180 may run along a length of the vertical guide 104 and may include a plurality of teeth $\mathbf{206}_1$ to $\mathbf{206}_n$ (also referred to herein individually as a tooth 206 or collectively as teeth 206). The teeth 206 may be spaced apart evenly along a length of the linear ratchet 180. For example, the teeth 206 may be spaced evenly apart by a distance 208.

In one embodiment, the teeth 206 may each have a raised lip that can be used to "catch" and "hold" a bar or pin on a brake attached to a bottom most panel $\mathbf{108}_1$, as described in further details below.

Figure 3:
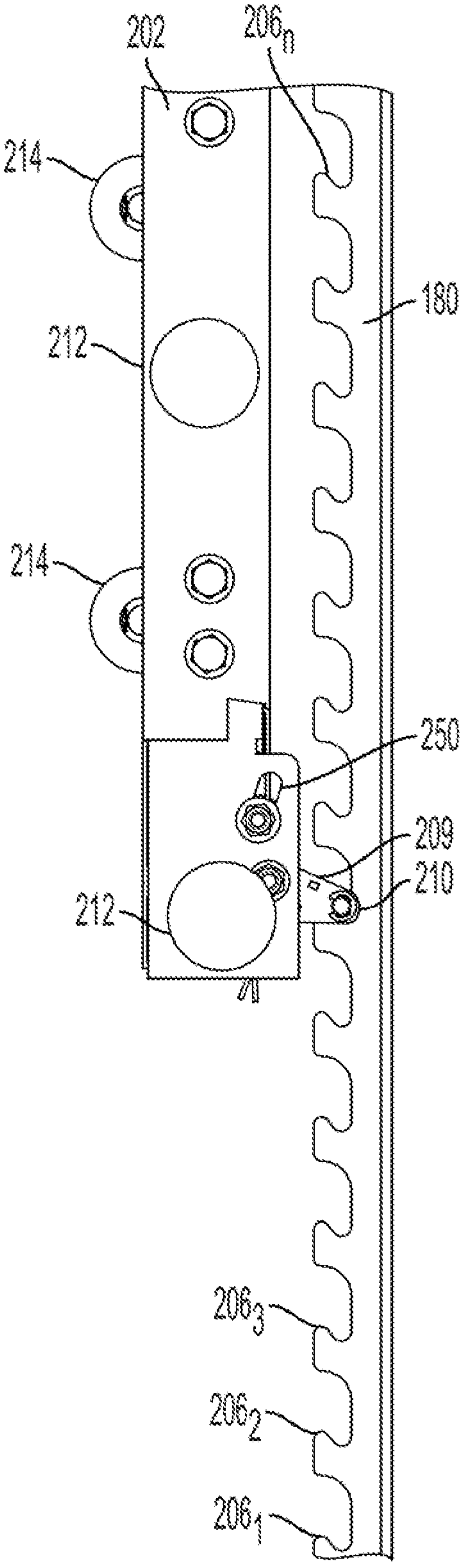
FIG. 3 is a side view of an example braking system of the present disclosure.

FIG. 3 illustrates a side view of a brake 209 that is coupled to the bottom most panel $\mathbf{108}_1$ and how the brake 209 interacts with the linear ratchet 180. In one embodiment, the brake 209 may be coupled to an endcap 202 of the panel $\mathbf{108}_1$. In one embodiment, the brake 209 may be formed as an integral part of the endcap 202 of the panel $\mathbf{108}_1$. As discussed above, the brake 209 may be deployed on one side of the panel $\mathbf{108}_1$ or on both sides (e.g., opposite sides) of the panel $\mathbf{108}_1$.

In one embodiment, the endcap 202 may include one or more track wheels 212. The track wheels 212 may move within the vertical guide 104, the panel interface zone, the first horizontal track portion 110 and the second horizontal track portion 112. In one embodiment, the endcap 202 of the bottom most panel $\mathbf{108}_1$ may also include one or more rollers 214. The rollers 214 may help prevent panels 108 above the panel $\mathbf{108}_1$ from rotating when the above panels 108 are in the horizontal door guide 106.

As discussed above, there may be instances where the door 102 may not shut properly. As a result, the interaction between the brake 209 and the linear ratchet 180 may hold the panels 108 when trying to close, if the panels 108 are not moving properly.

In one embodiment, when the brake 209 is engaged, a rod 210 or brake rod 210 may extend upwards and outwards away from the panel $\mathbf{108}_1$ and towards the linear ratchet 180. The rod 210 may slide vertically along a slot 250 within the endcap 202 and rotationally outward, as described in further detail below. The rod 210 may engage one of the teeth 206 and prevent the panel $\mathbf{108}_1$ and other panels above the panel $\mathbf{108}_1$ from moving.

Figure 4:
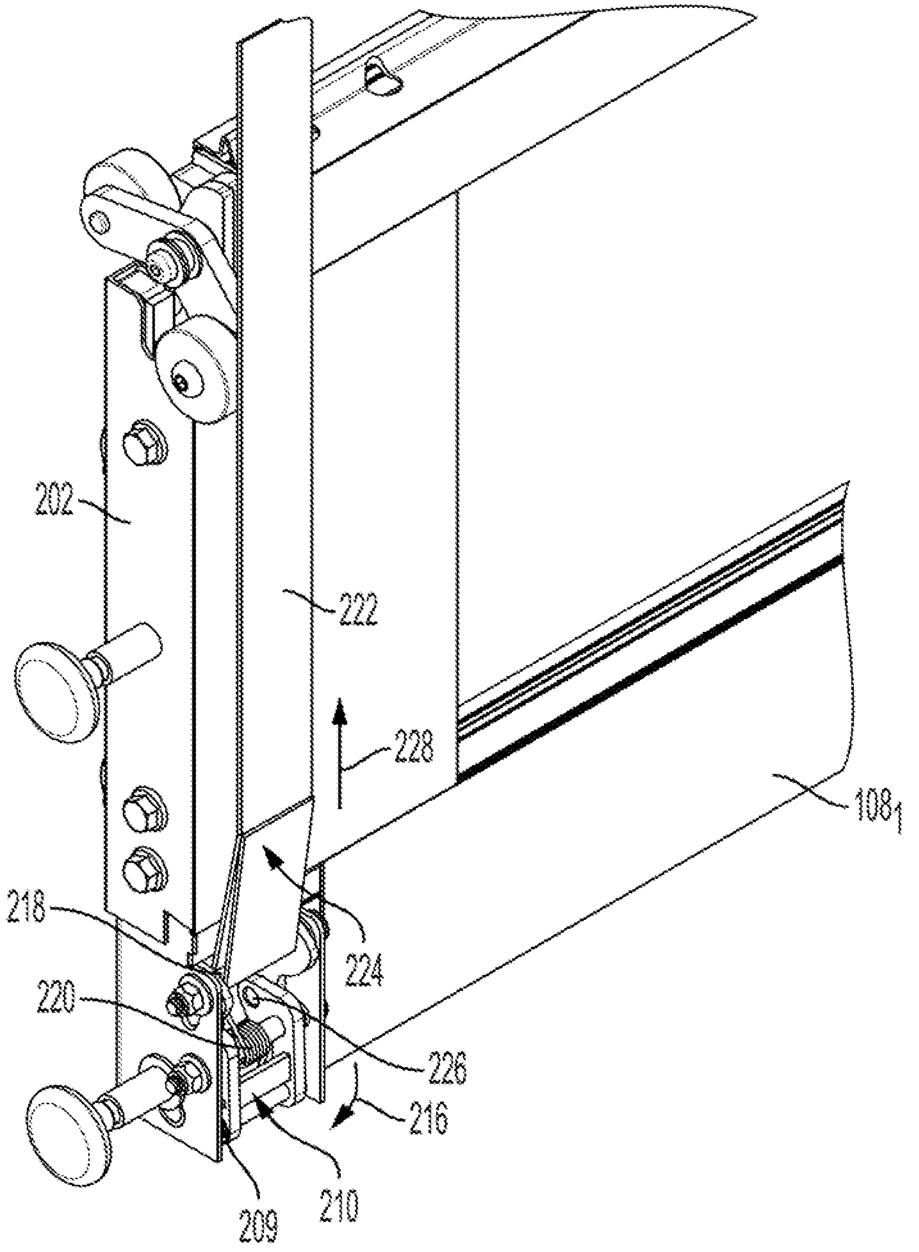
FIG. 4 is an isometric front view of an example end cap of a bottom most panel with a brake and a strap of the present disclosure.
Figure 5:
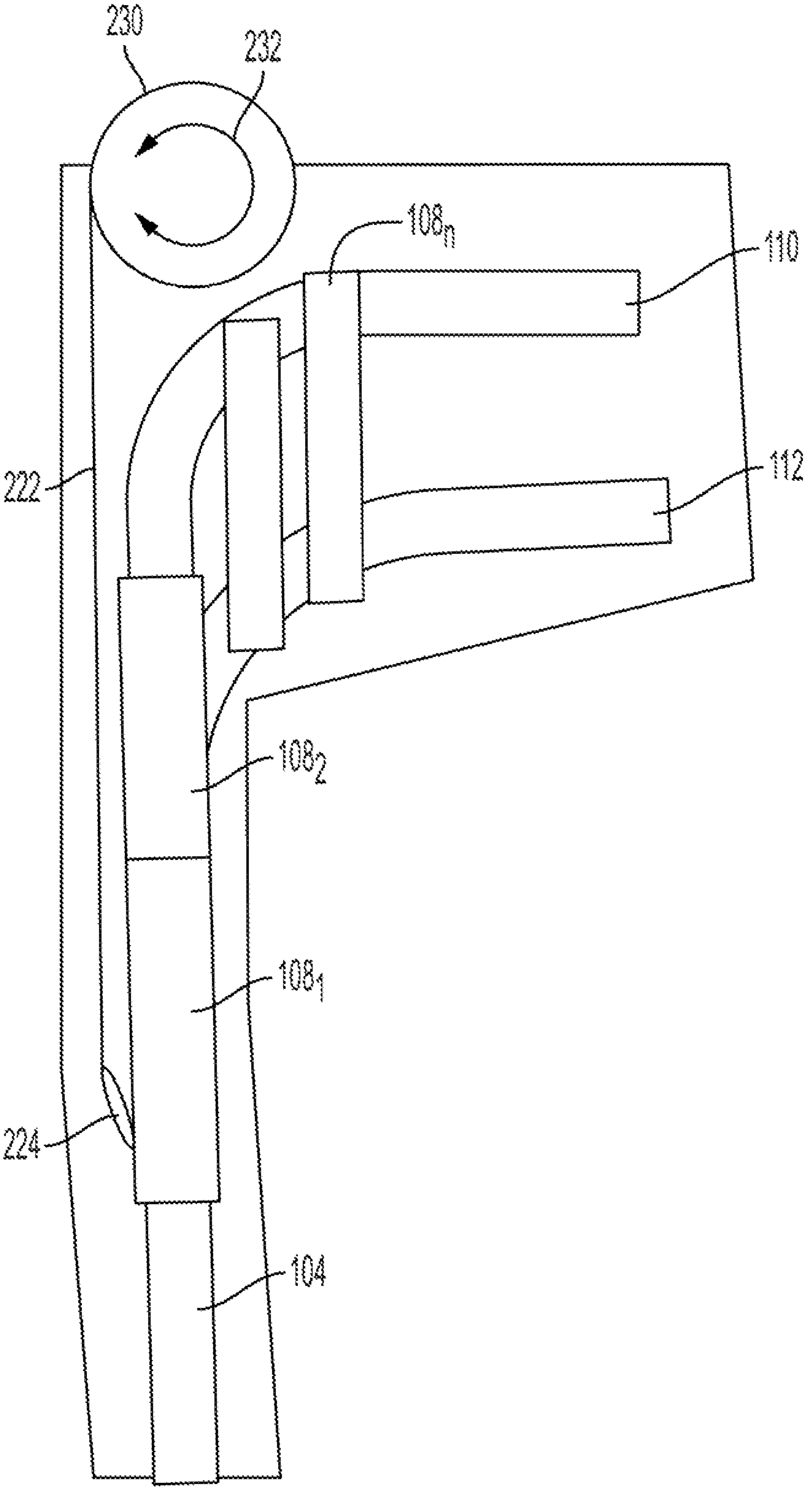
FIG. 5 is a side view of an example of the strap connected to a counterbalance system of the present disclosure.

FIG. 4 illustrates an isometric view of the endcap 202 of the bottom most panel $\mathbf{108}_1$ with the brake 209 and a strap 222 of the present disclosure. In one embodiment, the strap 222 may have a loop 224 on a first end that is coupled to a rod 218 or control rod 218 of the brake 209. For example, the rod 218 may be slipped through the loop 224 before being coupled to the brake 209. The strap 222 may have a second end that is coupled to a counter balance system, as shown in FIG. 5. Thus, when a proper amount of tension is applied to the strap 222, the strap 222 may provide an upward force that pulls the rod 218 upwards in a direction shown by an arrow 228 and acts against the torsion spring 220 that illustrates upward and downward directions.

The upward pull of the rod 218 may pull the rod 210 inwards towards the brake 209 and away from the linear ratchet 180. For example, the first rod 218 coupled to the strap 222 and the second rod 210 may be coupled together via a torsion spring 220 and a bracket 226. As the rod 218 is pulled upwards, the upward movement of the rod 218 may cause the torsion spring 220 to rotate clockwise in a direction shown by an arrow 216. The rotation of the torsion spring 220 may pull the rod 210 inwards and away from the linear ratchet 180. Thus, the rod 210 is moved clear from the path of the linear ratchet 180 as the door 102 is opened and closed.

Said another way, the torsion spring 220 may have a first force and the strap may have a second force created by the tension in the strap 222. When the second force of the strap 222 is greater than the first force of the torsion spring 220, the strap 222 may provide an upward force on the control rod 218 to act against the first force of the torsion spring 220 and pull the brake rod 210 in a downward and inward direction when the brake rod 210 is disengaged.

When tension is reduced or lost on the strap 222 (e.g., due to the door 102 improperly closing or gaps between panels 108 being created due to a malfunction), the torsion spring 220 may unwind in a counter clockwise direction (e.g., a direction opposite the rotating arrow 216). Thus, the rod 218 may move downward (e.g., in a direction opposite the arrow 228) and the rod 210 may move in a direction outward and upward away from the brake 209 and towards the linear ratchet 180 to engage the brake 209, as illustrated in FIG. 3.

Said another way, when the tension in the strap 222 is reduced or lost, the second force of the strap 222 is less than the first force of the torsion spring 220. As a result, the torsion spring 220 acts against the brake rod 210 to move the brake rod 210 in an upward and outward direction when the brake rod 210 is engaged.

FIG. 5 illustrates a side view of the strap 222 connected to a counterbalance system 230 of the present disclosure. The counterbalance system 230 may include a motor and a rod that rotates, as shown by the arrow 232. The counterbalance system 230 may help open the door 102. For example, as the counterbalance system 230 rotates in a clockwise direction, the counterbalance system 230 may provide lift force to open the door 102.

As noted above, a first end of the strap 222 may be coupled to the rod 218 via the loop 224. A second end of the strap 222 may be coupled to the counterbalance system 230. When the door 102 is closing, the counterbalance system 230 may rotate in a counter-clockwise direction. The tension on the strap 222 may be applied by the weight of each panel 108 that moves into the vertical door guide 104 and rests against the bottom most panel $\mathbf{108}_1$ when the door 102 is being closed.

While closing, one of the panels 108 may get stuck in the panel interface zone or horizontal door guide 106. As a result, a gap may form between panels 108, reducing the amount of weight on the bottom most panel $\mathbf{108}_1$ and reducing the tension in the strap 222. When the tension in the strap 222 is lost or reduced, the brake 209 may engage the linear ratchet 180, as described above.

Figure 6:
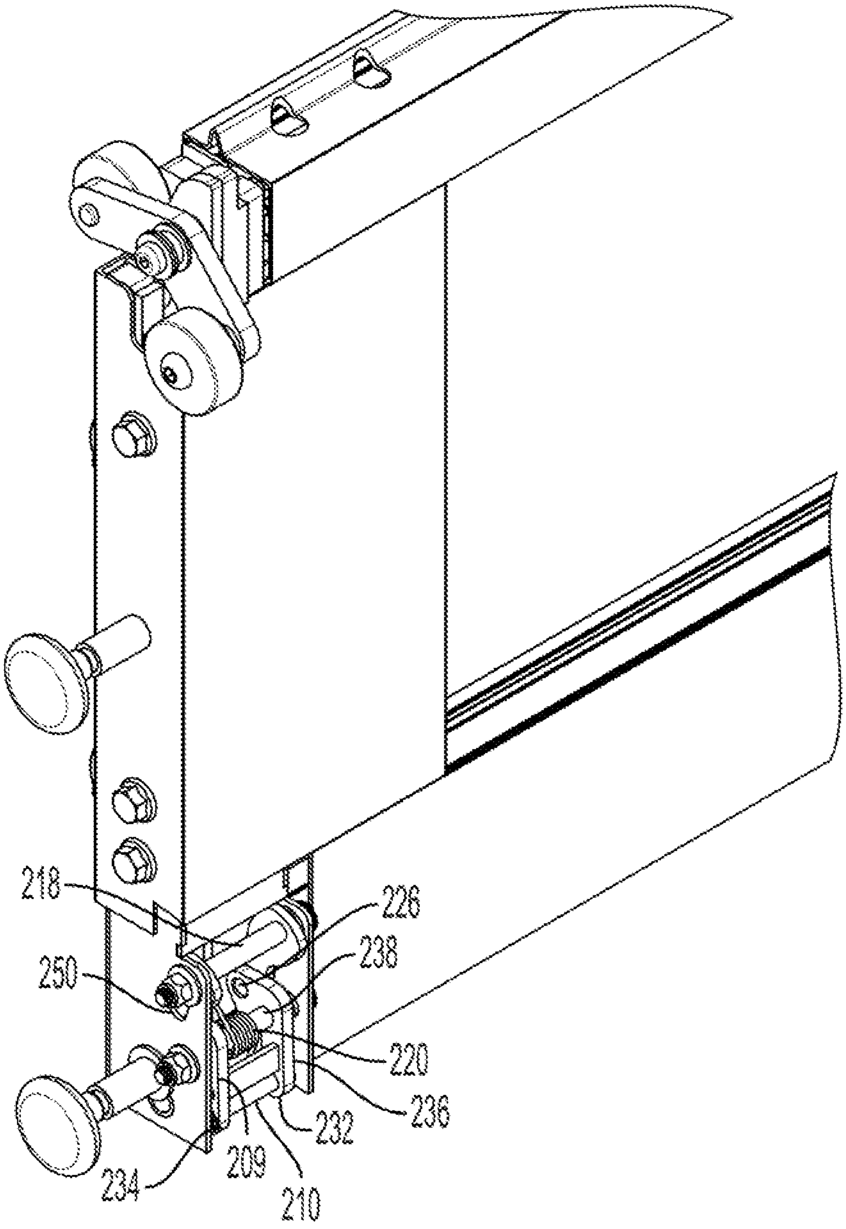
FIG. 6 is an isometric front view of the example brake without the strap to illustrate an example disengaged position of the brake of the present disclosure.
Figure 7:
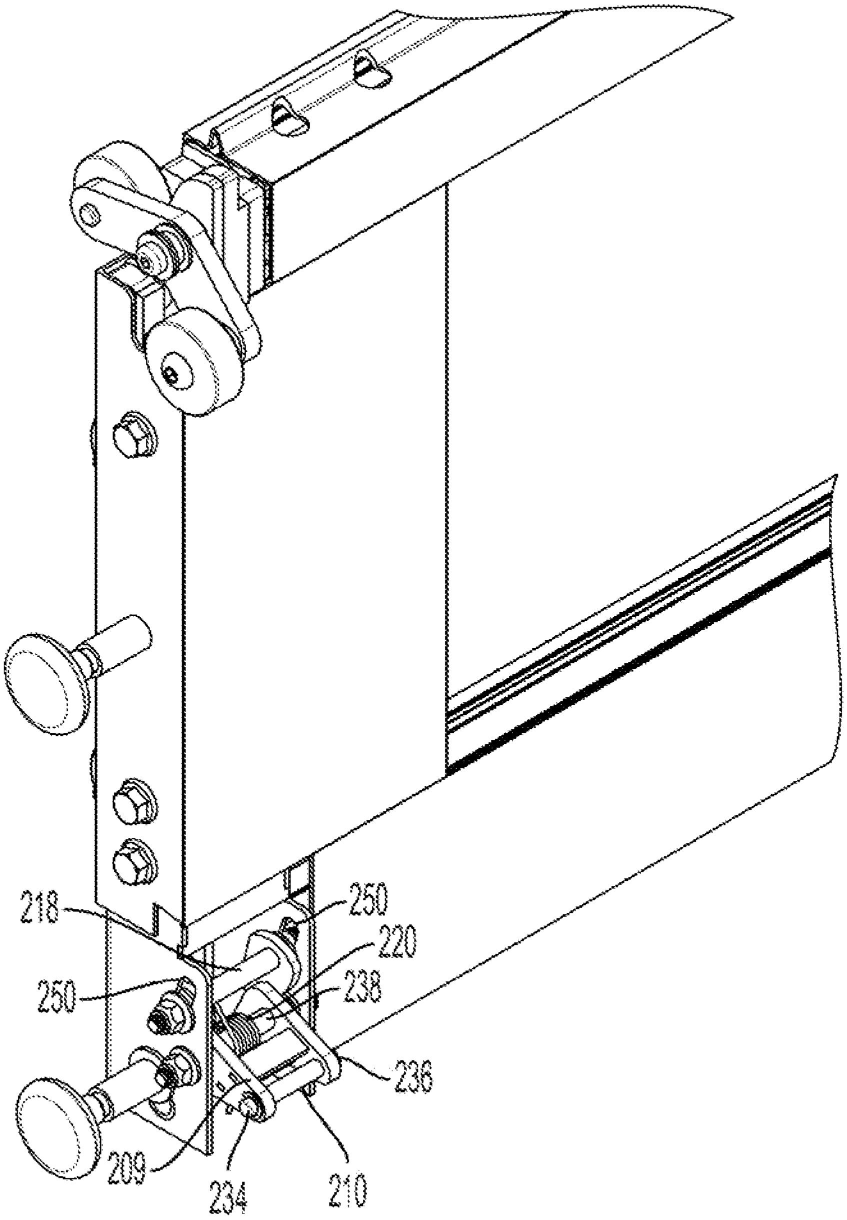
FIG. 7 is an isometric front view of the example brake without the strap to illustrate an example engaged position of the brake of the present disclosure.

FIGS. 6 and 7 illustrate example isometric front views of the brake 209 without the strap 222. FIG. 6 illustrates an example view of the brake 209 in a disengaged position. FIG. 7 illustrates an example view of the brake 209 in an engaged position.

FIG. 6 illustrates the brake 209 having slots 250 on opposite sides. The slots 250 may each have an elongated opening that defines a movement path of the rod 218. The slots 250 may be formed at an angle (e.g., approximately 45 degrees) to allow the rod 218 to move from a bottom left position to an upper right position. When tension is applied to the strap 222, the strap 222 may pull the rod 218 to the top part of the slots 250 (e.g., the upper right position).

The movement of the rod 218 along the slots 250 may cause the torsion spring 220 to rotate in a clockwise direction. The torsion spring 220 may be wrapped around a third rod 238. The third rod 238 may be part of a bracket 226. The bracket 226 may include a first bracket plate 234 and a second bracket plate 236. The rod 210 may be coupled to the bracket 226 between the first bracket plate 234 and the second bracket plate 236. The clockwise rotation of the torsion spring 220 may cause the bracket 226 to rotate and move the rod 210 downwards and inwards and away from the linear ratchet 180. In other words, the rods 210 and 218 may be moved in opposite directions away from one another in the disengaged position.

FIG. 7 illustrates how the rod 218 is moved to the bottom part of the slots 250 when the tension in the strap 222 is lost. The torsion spring 220 may rotate in a counter-clockwise direction or coil around the rod 238 when the tension is lost in the strap 222. The counter-clockwise rotation of the torsion spring 220 may cause the bracket 226 to rotate and move the rod 210 away from the brake 209 and towards the linear ratchet 180 into the engaged position.

Figure 8:
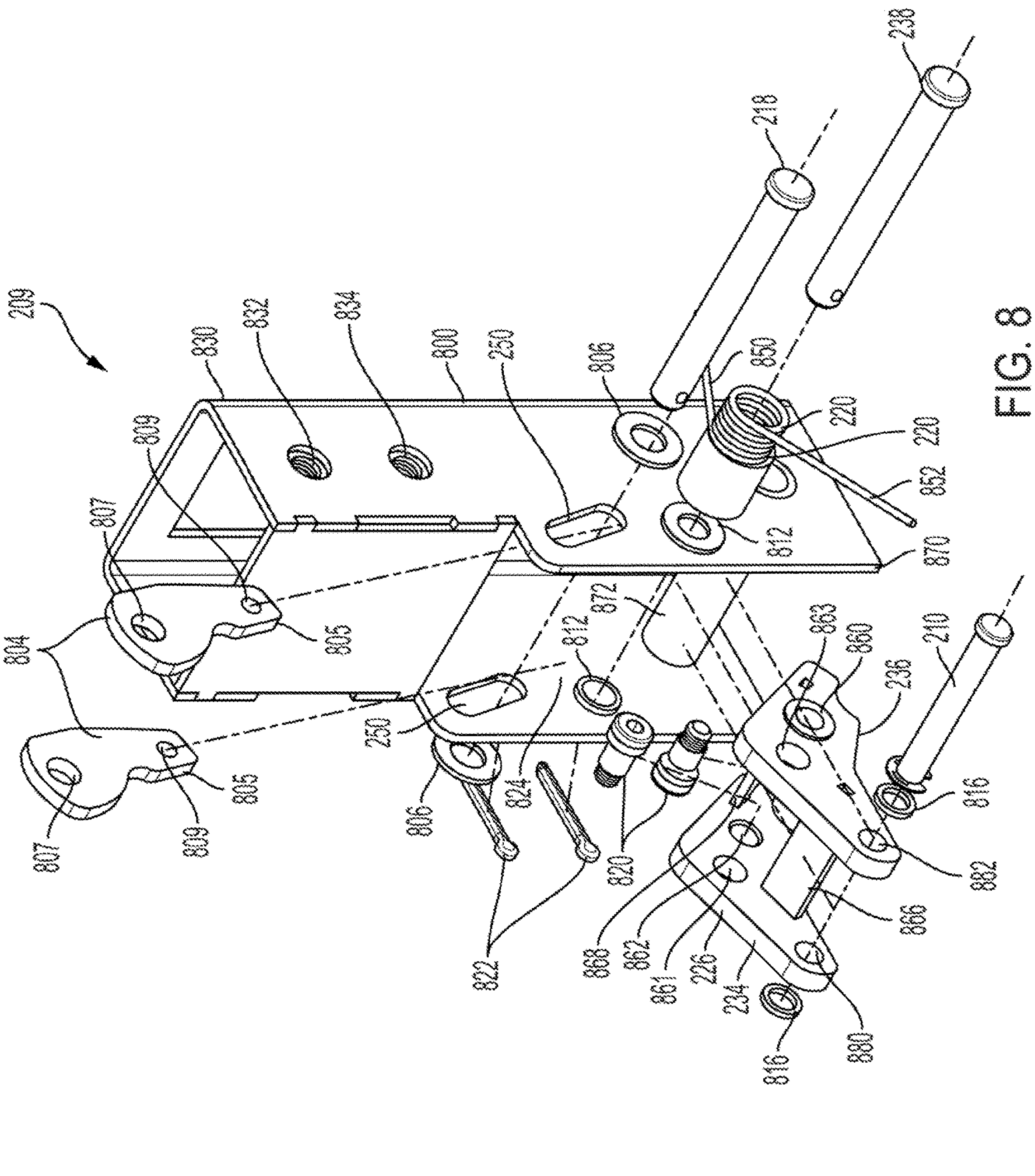
FIG. 8 is an exploded view of the example brake of the present disclosure.

FIG. 8 illustrates a detailed exploded view of the brake 209. In one embodiment, the brake 209 may include a housing 800. The housing 800 may be fabricated from steel or sheet metal. The housing 800 may include a top portion 830 that is inserted into the endcap 202 of the bottom most panel $\mathbf{108}_1$. The brake 209 can be secured the endcap 202 using mechanical fasteners (e.g., a nut and bolt, screw, rivet, a bolt and pin, and the like) that are fed through threaded openings 832 and 834 and corresponding openings in the endcap 202.

In one embodiment, the housing 800 may include the slots 250, as described above. The slots 250 may have a generally rectangular shape with curved ends. The slots 250 may be formed at an angle (e.g., approximately 45 to 70 degrees) to define a path for movement for the rod 218 as tension is applied or lost to the strap 222. The slots 250 may provide enough space for the rod 218 to move approximately 0.5 inches to 0.75 inches.

In one embodiment, the rod 218 may be fitted through the openings formed by the slots 250 and corresponding openings 807 of opposing slide arms 804. The rod 218 may be any type of bolt or rotational screw. FIG. 8 illustrates an example in which the rod 218 is a bolt and pin combination. For example, a bolt may be fitted through washers 806 and secured via a locking clip 822.

The slide arms 804 may be located within an interior volume 824 (e.g., on the inner sides) of the housing 800. The slide arms 804 may rotate as the bolt 218 moves along the slots 250. The slide arms 804 may include arm portions 805 that interact with the bracket 226 to move the rod 210 into an engaged and disengaged position. The slide arms 804 may be movably coupled to the bracket 226 via screws 820. The screws 820 may be inserted from an interior side of the bracket 226 through openings 862 and 860 to be coupled to the openings 809 of the slide arms 804.

In one embodiment, the housing 800 may include a second set of openings 812. The second set of openings 812 may be aligned with an opening 861 in the first bracket plate 234 and an opening 863 in the second bracket plate 236. The rod 238 may be fed through the openings 812, 861, and 863 to position the rod 238 between the first bracket plate 234 and the second bracket plate 236. The rod 238 secures the torsion spring 220 and the bracket 226 within an interior volume 824 of the housing 800. It should be noted that FIG. 8 illustrates the torsion spring 220 outside of the housing 800 for illustrative purposes to allow the details of the torsion spring 220 to be seen. However, the torsion spring 220 will be located within the interior volume 824 and around the rod 238 when the brake 209 is assembled, as shown in FIGS. 4, 6, 7, and 9.

A first end 850 of the torsion spring 220 may be positioned against a member 872. The member 872 may be a cylindrical member that is fixably coupled to the interior volume 824 of the housing 800, as shown in FIG. 8. A second end 852 of the torsion spring 220 may interact with the braking rod 210. Thus, as the torsion spring 220 rotates clockwise and counter-clockwise, the first end 850 may interact with the member 872 when the brake rod 210 is disengaged and the second end 852 may interact with the brake rod 210 to move the brake rod 210 to an engaged position when tension is lost or reduced on the strap 222.

For example, when tension is applied to the strap 222 and the rod 218 is pulled to a top position of the slots 250, the slide arms 804 may be rotated further inwards within the interior volume 824. The torsion spring 220 may be rotated, and rotation of the torsion spring 220 may cause the first end 850 to rest against the member 872 in a disengaged position. Said another way, the bracket 226 may be rotated such that the rod 210 is behind a front edge 870 of the housing 800 or does not extend beyond the front edge 870 of the housing 800.

When tension is reduced or lost in the strap 222, the torsion spring 220 may be allowed to rotate freely in an opposite direction such that the second end 852 of the torsion spring 220 may act against the rod 210 via the slide arms 804. As a result, the rod 218 falls to a bottom position of the slots 250. Movement of the rod 218 causes the slide arms 804 to rotate such that the arm portions 805 move towards the front edge 870 of the housing 800. The arm portions 805 may cause the bracket 226 to rotate about the rod 238, and the second end 852 of the torsion spring 220 may move the rod 210 out of the interior volume 824. Said another way, the rod 210 is moved beyond the front edge 870 of the housing 800.

Figure 9:
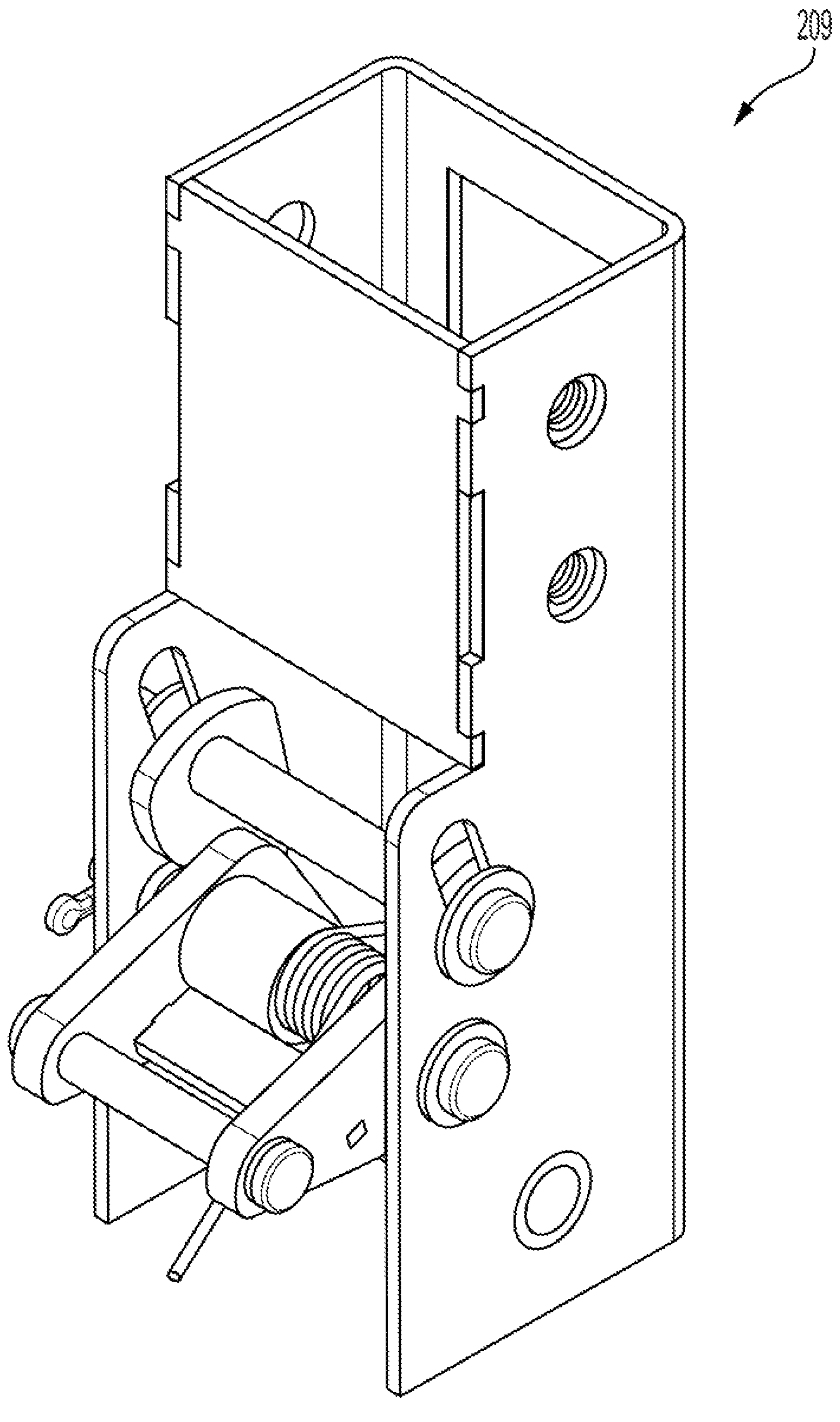
FIG. 9 is an isometric view of the fully assembled example brake of the present disclosure.

In one embodiment, the rod 210 may be fed through an opening 880 on the first bracket plate 234 and an opening 882 on the second bracket plate 236 to position the rod 210 between the first bracket plate 234 and the second bracket plate 236. In one embodiment, shims 816 may be used to fit the rod 210 between the first bracket plate 234 and the second bracket plate 236. The rod 210 may be secured between the first bracket plate 234 and the second bracket plate 236 with a pin or nut and bolt combination. Members 866 and 868 may be located between the first bracket plate 234 and the second bracket plate 236 to provide additional stability and proper spacing between the first bracket plate 234 and the second bracket plate 236. FIG. 9 illustrates an isometric fully assembled view of the brake 209.

Figure 10:
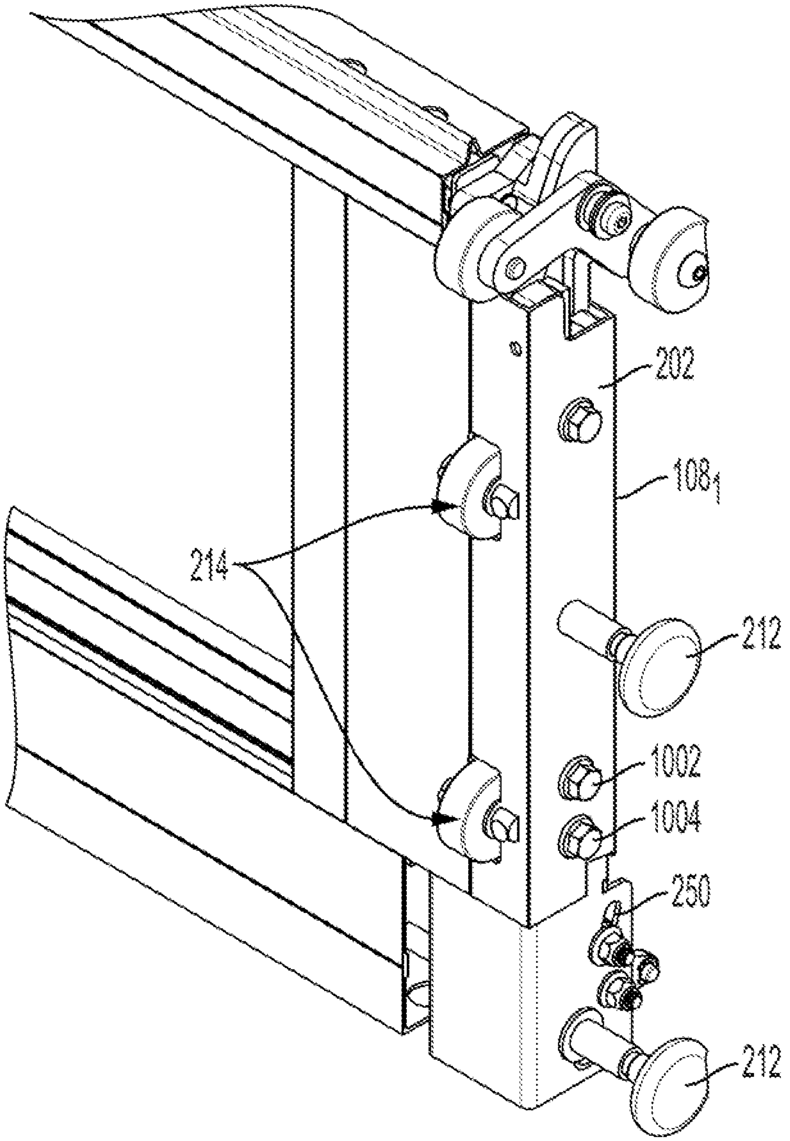
FIG. 10 is an isometric back view of an example end cap of the bottom most panel with rollers of the present disclosure.

FIG. 10 illustrates an isometric back view of the end cap 202 with the rollers 214. FIG. 10 illustrates the mechanical fasteners 1002 and 1004 that can be used to secure the top portion 830 of the housing 800 to the endcap 202, as described above.

In addition, FIG. 10 illustrates the rollers 214 of the endcap 202. As discussed above, the rollers 214 may help prevent panels 108 above the panel $\mathbf{108}_1$ from rotating when the above panels 108 are in the horizontal door guide 106.

Thus, the present disclosure provides a unique braking system for a vertically stacking panel door system. The braking system provides a mechanical solution to stopping movement of disconnected panels from closing when a gap is created between panels while closing or when a panel gets stuck while closing. The brake may be engaged until the gap is removed or the panels are freed.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A braking system for a vertical stacking panel door, comprising:
- a housing, wherein the housing comprises angled slots;
- a first rod coupled to the angled slots of the housing in an interior volume of the housing;
- a strap comprising a loop on an end of the strap, wherein the strap is coupled to the first rod via the loop;
- a second rod movably coupled to the housing, wherein the second rod is to engage a linear ratchet when moved from a disengaged position to an engaged position; and
- a torsion spring, wherein an end of the torsion spring interacts with the second rod, wherein tension from the strap moves the first rod within the angled slots and causes the torsion spring to rotate in a first rotational direction to cause the second rod to move into the disengaged position, and the torsion spring rotates in a second rotational direction to allow the first rod to move within the angled slots of the housing such that the end of the torsion spring and the movement of the first rod cause the second rod to move into the engaged position when tension is lost on the strap.

2. The braking system of claim 1, wherein the strap is coupled to a counter balance system of the vertical stacking panel door system.

3. The braking system of claim 1, wherein the tension on the strap causes the first rod to move in a first direction within the angled slots and causes the second rod to move in a second direction that is opposite to the first direction.

4. The braking system of claim 3, wherein the first direction is an upward direction and the second direction is a downward direction.

5. The braking system of claim 1, wherein when the tension is lost on the strap, rotation of the torsion spring in the second rotational direction causes the first rod to move in a downward direction within the angled slots to cause the second rod to move in an upward and outward direction.

6. The braking system of claim 1, further comprising:
- a third rod coupled to the housing in the interior volume of the housing, wherein the torsion spring is wrapped around the third rod.

7. The braking system of claim 6, further comprising:
- a first bracket plate; and
- a second bracket plate, wherein the first bracket plate and the second bracket plate are rotatably coupled to the housing, wherein the second rod and the third rod are positioned between the first bracket plate and the second bracket plate.

8. The braking system of claim 1, further comprising:
- opposing slide arms, wherein the first rod is coupled to the housing via the opposing slide arms that are coupled to the angled slots of the housing, wherein the first rod is coupled between the opposing slide arms.

9. The braking system of claim 8, wherein each one of the opposing slide arms comprises an arm portion, wherein the arm portion interacts with a bracket coupled to the second rod to move the second rod into the engaged position when the tension is lost on the strap.

10. The braking system of claim 1, wherein the braking system is located on each side of a bottom most panel of the vertical stacking panel door system.

11. An end cap for a bottom most panel of a vertical stacking panel door, comprising:
- at least one track wheel located along an outer side to move along a track system of the vertical stacking panel door system;
- at least one roller located on a back side;
- a brake located on a bottom end of the end cap, wherein the brake comprises:
  - a housing, wherein the housing comprises angled slots;
  - a control rod coupled to the angled slots of the housing in an interior volume of the housing;
  - a strap comprising a loop on an end of the strap, wherein the strap is coupled to the control rod;
  - a brake rod, wherein the brake rod is to move between a disengaged position and an engaged position; and
  - a torsion spring, wherein an end of the torsion spring applies a first force to the brake rod and the strap applies a second force to the control rod,
- wherein the brake rod is in the disengaged position when the second force of the strap is greater than the first force of the torsion spring, and the strap provides an upward force on the control rod that moves the control rod within the angled slots to allow the torsion spring to rotate in a first rotational direction such that the brake rod moves in a downward and inward direction, and the brake rod is in the engaged position when the second force of the strap is less than the first force of the torsion spring to allow the torsion spring to rotate in a second rotational direction such that the end of the torsion spring acts against the brake rod to move the brake rod in an upward and outward direction.

12. The end cap of claim 11, wherein the end cap is integrated into the bottom most panel of the vertical stacking panel door.

13. The end cap of claim 11, wherein the end cap is located on a side opposite a second end cap on a second side of the bottom most panel of the vertical stacking panel door.

14. The end cap of claim 11,
- wherein the angled slots are located on opposite sides of the bottom end of the end cap, wherein ends of the control rod are movably coupled to the slot on opposite sides of the bottom end of the end cap and the slot is to guide movement of the control rod.

15. A vertical stacking panel door system with a braking system, comprising:
- a track system;
- a linear ratchet coupled to a door jamb adjacent to the track system; and
- a vertical stacking panel door movably coupled to the track system, wherein the vertical stacking panel door comprises a plurality of disconnected panels, wherein a bottom most panel of the plurality of disconnected panels comprises a brake, the brake comprising:
  - a housing, wherein the housing comprises angled slots;
  - a first rod coupled to the angled slots of the housing in an interior volume of the housing;

a strap comprising a loop on an end of the strap, wherein the strap is coupled to the first rod via the loop;

a second rod movably coupled to the housing, wherein the second rod is to engage the linear ratchet when moved from a disengaged position to an engaged position; and a torsion spring, wherein an end of the torsion spring interacts with the second rod, wherein tension from the strap moves the first rod within the angled slots and causes the torsion spring to rotate in a first rotational direction to cause the second rod to move into the disengaged position, and the torsion spring rotates in a second rotational direction to allow the first rod to move within the angled slots of the housing such that the end of the torsion spring and the movement of the first rod cause the second rod to move into the engaged position when tension is lost on the strap.

16. The vertical stacking panel door system of claim 15, wherein the linear ratchet comprises a plurality of notches, each notch of the plurality of notches including a respective lip along a length of the linear ratchet.

17. The vertical stacking panel door system of claim 16, wherein the second rod is positioned within one notch of the plurality of notches and retained by the respective lip when moved into the engaged position.

18. The vertical stacking panel door system of claim 15, further comprising:

a counter balance system, wherein the strap is coupled to the counter balance system, and movement of the strap is controlled by counter balance system.

19. The vertical stacking panel door system of claim 15, wherein a change in the tension on the strap causes the first rod to move in an upward position within the angled slots to move the second rod in a downward and inward position such that the second rod is moved away from the linear ratchet.

20. The vertical stacking panel door system of claim 15, wherein when the tension is lost on the strap, a force of the torsion spring is greater than the tension on the strap such that the torsion spring rotates to allow the first rod to move in a downward direction within the angled slots to cause the second rod to move in an upward and outward direction such that the second rod catches a notch in the linear ratchet.

* * * * *